Sept. 13, 1960     J. A. HELTON     2,952,810
TEST ADAPTER FOR ELECTRONIC EQUIPMENT
Filed Nov. 28, 1958     2 Sheets-Sheet 1
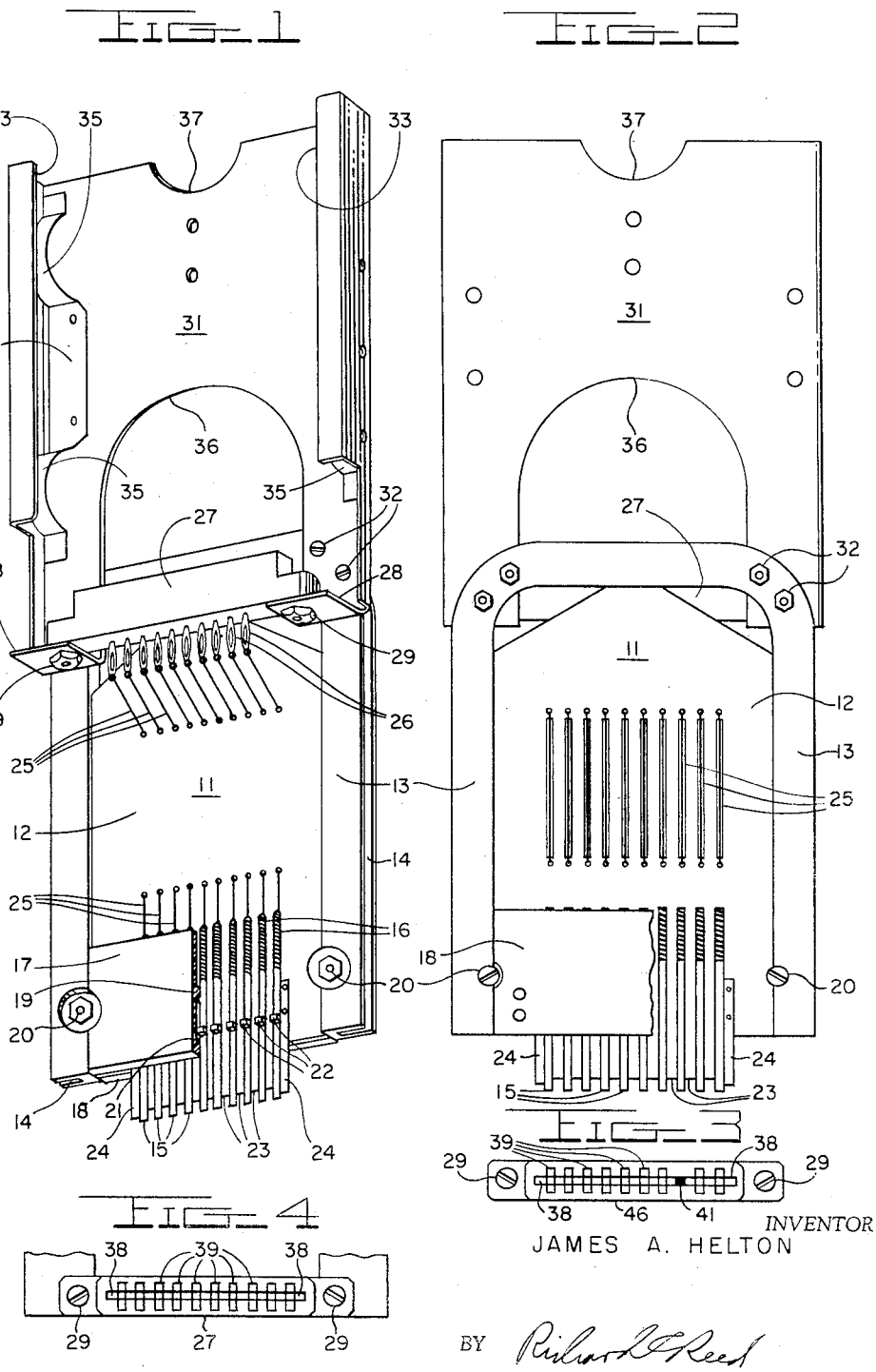
INVENTOR
JAMES A. HELTON
BY
ATTORNEY

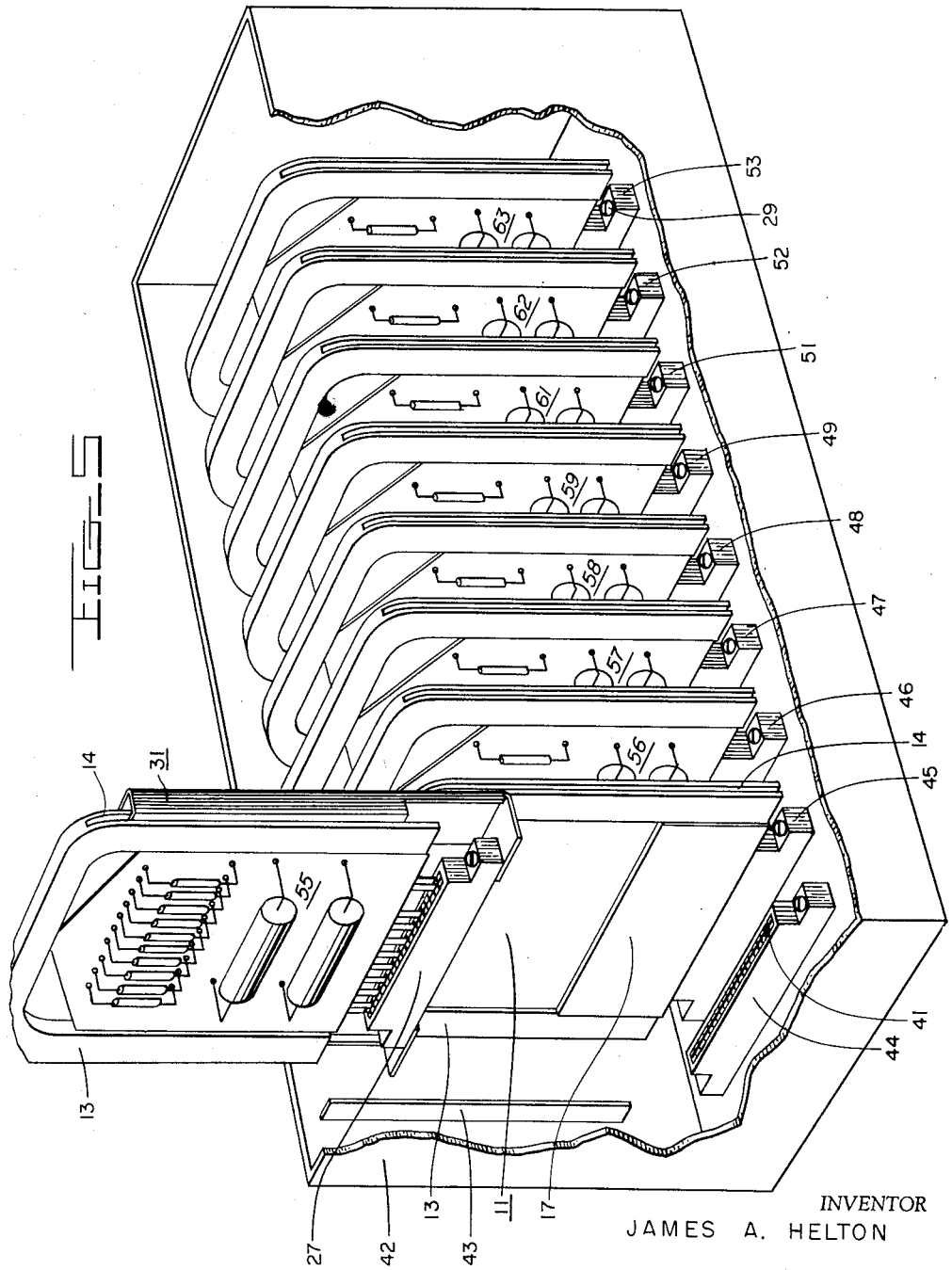

2,952,810

TEST ADAPTER FOR ELECTRONIC EQUIPMENT

James A. Helton, Washington, D.C.

Filed Nov. 28, 1958, Ser. No. 777,160

4 Claims. (Cl. 324—158)

(Granted under Title 35, U.S. Code (1952), sec. 266)

The invention described herein may be manufactured and used by or for the Government of the United States of America for governmental purposes without the payment of any royalties thereon or therefor.

This invention relates to test adapters, and more particularly to adapters for the dynamic testing of printed circuits mounted in sliding U shaped supports.

In the manufacture of electronic equipment, the necessity for compactness has resulted in the loss of adequate space within such equipment in which the proper testing of the components of the circuitry included therein can be accomplished. The advantages of testing circuits and components in their dynamic states and while being subjected to every parametric value encountered in the usage of such equipment have been sacrificed to the advantages of compactness. Optimum operational characteristics of such equipment are being increasingly jeopardized by such lack of dynamic testing. This invention provides an appropriate solution to these problems by means of an adapter to render the suspected circuit readily and completely accessible for testing purposes while still being electrically connected to the basic equipment with full operational capabilities. The adapter of this disclosure is so dimensioned that it can be inserted into the space vacated by the circuit being tested, thereby removing the necessity of dynamic testing of circuitry as being any limiting consideration in the design of electronic equipment in which compactness is important.

It is therefore, an object of this invention, to provide an adapter whereby circuits and components can be tested dynamically.

Another object is to provide for the testing of electronic equipment in which compactness is the foremost consideration.

Still another object is to provide both maximum compactness and maximum dynamic testing capabilities in electronic equipment.

A further object is to provide ready access to an operating electronic circuit and its components which is otherwise unavailable for careful inspection or testing.

Other objects and advantages of the invention will hereinafter become more fully apparent from the following description of the annexed drawings, which illustrate a preferred embodiment, and wherein:

Fig. 1 shows a perspective view of a preferred embodiment of the adapter of this invention;

Fig. 2 shows the reverse side of the adapter shown in Fig. 1;

Fig. 3 shows the details of a typical connector socket in the basic electronic equipment with a typical keying means therein;

Fig. 4 shows the details of a typical connector socket in the adapter of Figs. 1 and 2; and Fig. 5 shows a cut away perspective view of the basic electronic equipment with the adapter shown in its operative position.

Briefly, the structure of this invention can provide spatial displacement of a printed circuit board which is otherwise inaccessible in a compact electronic device. This is accomplished by providing support for the adapter within the electronic device in the position normally occupied by the printed circuit to be tested, by providing support means on the adapter to secure the printed circuit to be tested, and by providing electrical connection through the adapter from each of the contacts available in the basic electronic device to corresponding contacts in the adapter. The adapter is so dimensioned that the printed circuit to be tested is supported in such a manner as to be clear from hindrance by the structure of the basic electronic equipment. Further, the adapter is of such dimensions as to be readily insertable in the space within the basic electronic equipment which is normally occupied by the printed circuit to be tested. Since it is common that the several printed circuit boards of the basic electronic equipment have keyed sockets, that is, each socket has a uniquely placed ward, so that only a preselected circuit board can be inserted into its preselected socket to prevent erroneous assembly, the adapter of this invention accommodates for such keying by the provision of depressible contact elements. As for erroneous assembly, any error in the assembly of such printed circuits into the electronic equipment results not only in improper functioning of the circuit, but in the possible destruction of the circuit by improper application of the power supply. The depressible contact elements provide the desirable result that the ward will cause one of the contact elements to be depressed while all of the other contact elements are inserted into the socket.

Referring now to the drawings, wherein like reference characters designate like or corresponding parts throughout the several views, there is shown in Fig. 1, which illustrates a preferred embodiment, an adapter made up of two principal parts 11 and 31. The lower part 11 includes an insulating board 12 mounted within a U shaped support 13. A groove 14 in the periphery of support 13 provides for securing the adapter in its operative position. A plurality of contacting pins 15 are located tension loaded by springs 16 and are secured in operative position by first insulating mounting plate 17 and rear insulating mounting plate 18. The freedom of movement along the axis of each of the contact pins 15 is limited by the engagement of a detent means 22 on each pin 15 and either of abutment elements 19 or 21 on insulating mounting plate 17. The pins 15 are physically and electrically separated by insulating strips 23 which can be integral parallel appendages insulating board 12. Guides 24 are provided at both ends of the row of pins 15 so that the pins 15 will be properly positioned into the sockets 44 to 53 as shown in Figs. 3 and 5. The space occupied by the guide members 24 is designated as opening 38 in Fig. 3.

The pins 15 are electrically connected through springs 16, conductors 25, which are secured on insulating board 12, and through connectors 26 in the base of socket 27, to contact 39 within socket 27, as shown in Fig. 4. The socket 27 is secured to flanges 28 of the upper part 31 by securing means 29. The upper part 31 is connected to the lower part 11 by securing means 32.

The flanges 33 of the upper part 31 are provided to engage the slot 14 of the U shaped structure such as is represented by devices 55 through 63 in Fig. 5. The spring designated as 34 with curved sections 35 assure snug mounting of the circuit board, such as circuit board 55 as shown in Fig. 5. The configuration of the cut away portions of the structure 31 which are represented by numerals 36 and 37 can be of any design that will provide access to the back of the circuit board to be tested and will provide ease of removal of the adapter from the device in which the circuit board is tested.

Fig. 2 shows a view of the back side of the adapter shown in Fig. 1. Connecting wires 25 are shown with insulation thereon.

Fig. 3 shows the socket 46 which is shown as the third socket from the left in Fig. 5. In addition to the openings 38 for the guides 24 of the adapter and the circuit boards, and also the contacts 39, ward 41 is shown. Ward 41 is a structure which occupies the space normally occupied by a contact 39. Ward 41 is so dimensioned that there is no room for a pin 15 to be inserted therein. Since no two of the sockets 44 through 53 have wards 41 in the same relative position, the possibility of erroneous assembly is removed.

Fig. 4 shows a top view of the socket 27 which is used in the adapter of this invention. It is immediately apparent that there is no ward 41 included in this socket. A contact 39 is available for every possible contact pin which is intended to be inserted therein. Therefore, the absence of a contact pin which has been omitted for keying purposes will merely leave one of the contacts 39 unused. Since the adapter is insertable into any one of the sockets 44 to 53, the ward of such individual socket will cause the spring loaded pin 15 of the adapter to be retracted while all the other pins 15 of the adapter proceed into the contacts 39. The keyed pin 15 of the adapter makes no electrical contact. The particular conductor 25 connected thereto conducts no electrical current, the particular contact 39 connected thereto likewise is unemployed and has no contact pin 15 inserted therein from the circuit board to be tested, as shown in Fig. 5.

Fig. 5 shows the adapter of this invention in its operative position with the exception of final insertion of the printed circuit board 55 into the adapter. It is to be observed the circuit to be tested can be tested in its dynamic condition, that is, while being connected the same as in its normal operating environment and while being subject to all of the circuit parameters of normal usage.

Circuit board 55 is mounted so that the groove 14 in the U support 13 thereof is supported by flange 33 of the upper part 31 of the adapter. Obviously, all of the components of the circuit board 55 are readily available to be tested whereas the components of the other circuit boards shown are not available to be tested. It is noted that flange 43 is utilized by the U shaped member 13 of the adapter for support.

In the socket 44, the key 41 is shown to be in the first place of electrical contact from the right. The ward for the socket 45 is shown to be in the second place from the right by the absence of a connecting pin 15 in the second place from the right of the circuit board 55. It can be seen that one way that the ward can be placed in a different position for each of the circuit boards is to align the wards substantially diagonally across the base of the electronic device 42.

The employment of the device of this invention requires only these simple steps: first, the suspected circuit board is removed from the equipment; second, the adapter is inserted into the socket vacated by the suspected board; and third, the suspected circuit board is then inserted into the upper part of the adapter. The suspected board is then in position to be tested in its operative condition while still connected in its operating environment and while being subjected to every parametric value normally experienced in its operation.

It is, therefore, readily apparent that the adapter of this invention fully satisfies the requirement for providing full capability for dynamic testing of circuitry found in compact electronic equipment.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention set forth in the appended claims.

What is claimed is:

1. In combination, an electronic device having a plurality of sockets for a like plurality of electronic circuit board insertable units, said sockets including a plurality of equally spaced elements, said elements composed of a plurality of electrical contact means and a keying means, the particular element that is the keying means in each socket being a different element in each of the other sockets, an adapter for dynamically testing the electronic circuits on the insertable elements comprising means for spatially supporting an insertable unit to be tested, and means for electrically connecting said adapter into any of the sockets in the electronic device including a plurality of spring loaded connection pins equal in number and spacing to the plurality of equally spaced elements of said sockets, said spring loading of the connection pins affording electrical connection of every insertable unit with its socket without concern for the placement of the keying means in the socket to be used.

2. An adapter for dynamically testing electronic circuitry comprising a slidable support means, and insulating support means secured within said slidable support means, a plurality of spring loaded contacting pins slidably mounted on said insulating support means, a socket means, including a plurality of contact means, supported on said slidable support means and spatially displaced from said contacting pins, and means for electrically connecting all of said contact means and said contacting pins in pairs made up of one contact means and one contacting pin each.

3. An adapter for dynamically testing electronic circuitry comprising a slidable support means, and insulating support means secured within said slidable support means, a plurality of spring loaded contacting pins slidably mounted on said insulating support means, a socket means, including a plurality of contact means, supported on said slidable support means and spatially displaced from said contacting pins, means for electrically connecting all of said contact means and said contacting pins in pairs made up of one contact means and one contacting pin each, and means for supporting the electronic circuitry to be tested when it is connected into said socket means.

4. An adapter for dynamically testing electronic circuitry comprising a slidable U shaped support, an insulating support secured within said slidable support and coplanar therewith and including a plurality of parallel appendages extending beyond the opening of the slidable support, first and second insulation cover plates, one of said cover plates including two abutments which are spatially disposed from each other, said abutments being perpendicular to the said parallel appendages, a plurality of connecting pins, a plurality of spring means, one of said connecting pins being connected to each of said spring means, each of said spring means being secured between said cover plates, detent means interconnecting said pins and said abutments upon the lateral movement of said pins, guide means affixed adjacent the first and last of said connecting pins, a socket including a plurality of contacts equal in number to the plurality of connecting pins, conductive means connecting the plurality of pins and the plurality of contacts in pairs wherein each pair contains one pin and one contact from each plurality, and securing means so positioned as to provide support for the electronic circuitry to be tested and to provide proper positioning of the connecting pins of such circuitry within said socket.

References Cited in the file of this patent

UNITED STATES PATENTS

| 2,841,660 | Tabet | July 1, 1958 |
| 2,862,992 | Franz | Dec. 2, 1958 |

FOREIGN PATENTS

| 203,624 | Australia | Oct. 10, 1956 |